F. G. SIMPSON.
ELECTRIC SPARK GAP.
APPLICATION FILED MAR. 20, 1915.

1,163,568.

Patented Dec. 7, 1915.

WITNESSES:
O. Johnson
Frank Warren

INVENTOR
Frederick G. Simpson
BY
C. S. Haskins
ATTORNEY

UNITED STATES PATENT OFFICE.

FREDERICK G. SIMPSON, OF SEATTLE, WASHINGTON.

ELECTRIC SPARK-GAP.

1,163,568.  Specification of Letters Patent.  Patented Dec. 7, 1915.

Application filed March 20, 1915. Serial No. 15,864.

*To all whom it may concern:*

Be it known that I, FREDERICK G. SIMPSON, citizen of the United States, residing at Seattle, in the county of King and State of Washington, have invented a certain new and useful Improvement in Electric Spark-Gaps, of which the following is a specification.

My invention relates to improvements in electric spark-gaps, and the object of my improvement is to provide an electric spark-gap whose oppositely disposed electrodes shall be inclosed in an air tight space within a structure wherein such electrodes shall be electrically insulated from each other and be supported at a required distance apart by devices made of materials having nearly like coefficients of expansion, due to heat, whereby said electrodes may be maintained substantially at the same distance apart irrespective of changes in the temperature of the structure; and which spark-gap, by reason of the form of its structure, shall be adapted to be associated in series with other spark-gaps of a like form of construction, all of which spark-gaps, so connected in series, may act conjointly to quench a spark as it traverses such spark-gaps when they are connected in an electric circuit like an oscillating circuit of a wireless telegraph system.

Figure 1:
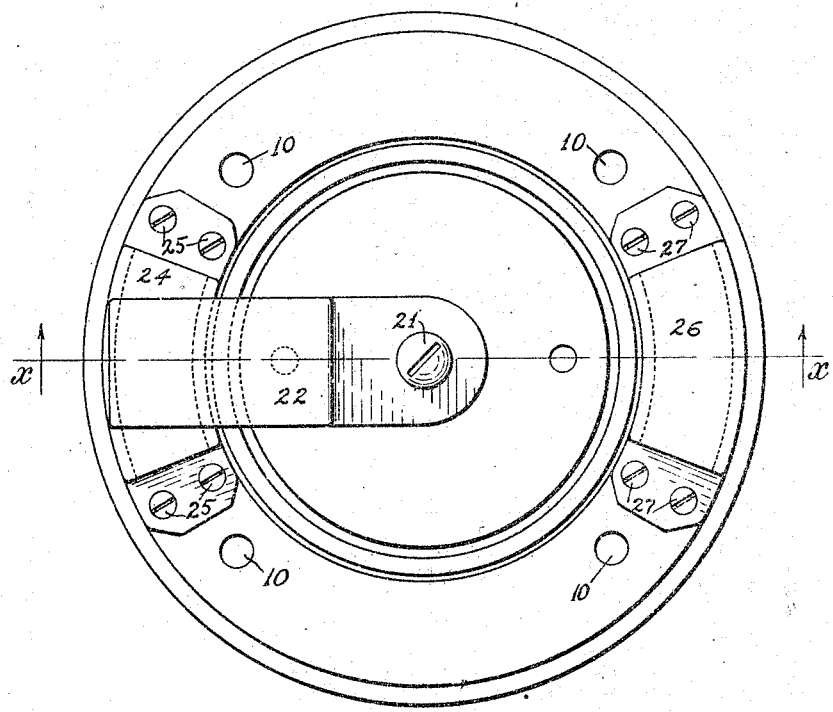
Figure 2:
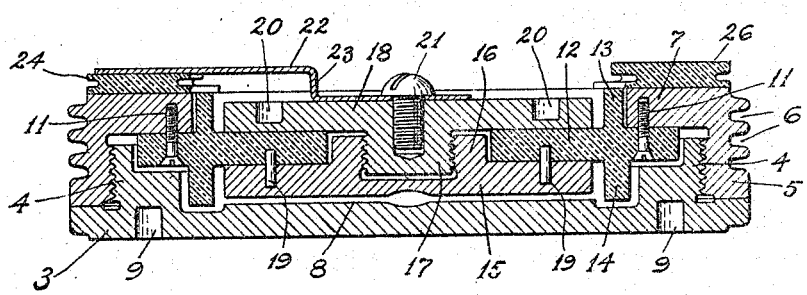

I accomplish this object by devices illustrated in the accompanying drawings wherein—Figure 1 is a plan view of a structure embodying my invention, and Fig. 2 is a view of the same in diametrical section on broken line *x. x* of Fig. 1.

Referring to the drawings, throughout which like reference numerals indicate like parts, a disk 3, of metal, is provided with an integral and concentrically disposed annular flange 4 which projects from the upper side thereof, said flange 4 being provided with an external screw-thread and being of a smaller external diameter than is the diameter of the periphery of the disk 3 whereby is provided an annular shoulder or seat against which is disposed the bottom surface of an annular and internally screw-threaded collar 5 which is screwed on to the flange 4.

The collar 5 is provided with a plurality of grooves 6 formed on its periphery whereby there is a greater surface for the radiation of heat and it is further provided with an inwardly projecting annular flange 7 above the flange 4 of the disk 3.

The upper side surface 8 of the disk 3 which is surrounded by the flange 4 is preferably covered or coated with silver, better to adapt it to serve as one of the electrodes of a spark-gap.

The bottom side of the disk 3 is provided with oppositely disposed circular recesses 9, within which recesses 9 may be inserted the studs of a spanner wrench, and the upper side of the annular flange 7 of the collar 5 is provided with like recesses 10 within opposite ones of which may be inserted the studs of another spanner wrench whereby such spanner wrenches may be operated conjointly to screw the collar 5 on to and off from the flange of the disk 3.

The bottom annular surface of the collar 5 and the adjacent annular surface of the disk 3 are accurately ground to engage each other in the same plane whereby they may be joined to make an airtight engagement with each other when the collar 5 is screwed to its fullest extent on to the flange 4.

Secured by screws 11 to the underside of the flange 7 in a position concentric with said flange 7 is an electric insulator 12 of annular form which is provided on its upper side with an upwardly projecting annular flange 13 and on its lower side with a downwardly projecting annular flange 14, as shown in Fig. 2.

Secured to the underside of the annularly formed insulator 12 and concentric therewith is a disk 15, of metal, which is provided with a hub portion 16 which projects upwardly into the opening through the central portion of the insulator 12, and such hub portion 16 is provided with a concentrically disposed screw-threaded recess into which is screwed the screw-threaded boss 17 of a disk 18, of metal, whose under surface engages with the top surface of the insulator 12 whereby the disk 15 is securely fixed to the underside of said insulator 12 when said disk 18 is turned to screw the boss 17 into the recess of the hub portion 16, there being provided dowel pins 19 in the insulator 12 and the disk 15, as shown in Fig. 2, to prevent the disk 15 from turning when the disk 18 is turned in the operation of securing the disk 15 to the insulator 12.

Oppositely disposed recesses 20 are provided in the upper side of the disk 18 wherein may be inserted the studs of a spanner wrench for turning said disk 18.

Secured to the central portion of the top side of the disk 18 by means of a screw 21 is an electrical contact spring 22, of sheet metal, which extends radially to a point near the outer edge of the collar 5 and which is provided with an upwardly directed offset 23 to adapt the outer end portion of the spring 22 to assume a position parallel with the top surface of the structure when it is pressed downwardly against an insulating member 24, of the form of a segment of a circle, which insulating member 24 is secured to the annular surface of the top side of the flange 7 by screws 25.

Diametrically opposite the insulating member 24 on the top side of the flange 7 is secured by screws 27 another insulating member 26, of like form but of a thickness equal to the combined thicknesses of the insulating member 24 and the spring 22, whereby when a plurality of structures, each like the structure of Figs. 1 and 2, are piled one on the top of the other to form a series of spark-gaps, then the under surface of a disk, as the disk 3, of one structure, may rest upon and make contact with the spring, corresponding to the spring 22, of another structure pressing such spring to rest against the insulating member corresponding to the insulating member 24, thus disposing all the structures of the series in parallel planes with each other and electrically connecting them in series each with the others. To connect such a series in an electric circuit one terminal of such circuit may be provided with a contact plug which may be disposed to fit within one of the recesses 9 of the lowermost structure while the other terminal of such circuit may be connected in any suitable manner to the disk corresponding to the disk 18 of the uppermost structure, as, for instance, by a wire of said circuit secured beneath the head of a screw corresponding to the screw 21.

In assembling the parts of a structure, like the structure of Figs. 1 and 2, the annular surfaces of the lowerside of the collar 5 and the upperside of the disk 3, near its periphery, are accurately ground to remove enough metal to dispose the lower silver coated surface of the disk 15 at a required short distance from the upper silver coated surface of the disk 3, thus when the collar 5, with its associated parts attached, is screwed to its full extent on to the annular flange 4 then the space between said two silver coated surfaces of the adjacent electrodes of the spark-gap will be air tight.

In order that the required distance between said two silver coated surfaces may be maintained as nearly constant as possible irrespective of changes in the temperature of the different parts of the structure it is important that the insulating member 12 shall be made of electric insulating material having as nearly as possible the same coefficient of expansion as is possessed by the metal embodied in the disks 3 and 15 and in the collar 5 and by experiment I have found that a composition known by the trade name of "Lavite" possesses very nearly the same coefficient of expansion as does cast bronze metal of which I make the metal parts of my structure and preferably I make the annular insulating member 12 of "Lavite" which is molded by molds into the form required, but I do not restrict myself to the use of any particular kind of metal or to the use of "Lavite" as an insulating material in making the different parts of my invention.

The annular flanges 13 and 14 of the insulator 12 serve as shields against the transmission of sparks between the peripheries of the disks 15 and 18 and the adjacent surfaces of the flanges 7 and 4 thus confining all sparking to the space between the silver coated surfaces of the disks 3 and 15.

In the structure thus described and illustrated it is manifest that the airtight joints between the surfaces of the insulator 12 and the surfaces of the disk 15 and flange 7 may be permanent and undisturbed when the collar 5 is unscrewed from or screwed on to the flange 4 in the operation of inspecting and cleaning the silver coated surfaces of the electrodes, the ground metal joint between the annular surfaces of the collar 5 and the disk 3 being the only joint disturbed in such operation thus assuring that the distance across the gap-space between the electrodes shall always be the same when said collar is replaced in its normal position after such inspection, and, further, assuring that such gap-space shall be airtight by reason of such ground metal joint.

Obviously changes may be made in the forms and dimensions of parts of my invention without departing from the spirit thereof.

What I claim is:

1. In a structure of the class described, the combination with a metal disk which is provided with an integral annular flange disposed to project from one side thereof, the surface of such one side within the circle of said annular flange being smooth and flat to adapt it to serve as one of the electrodes of a spark-gap, of an inwardly flanged collar removably disposed to surround said annular flange of said disk in engagement with said one side of said disk to make an airtight joint therebetween, an insulator of electricity of annular form secured in a concentric position to the inwardly projecting flanged portion of said collar, a second metal disk disposed with one of its sides in airtight engagement with the inner side surface of said annular insulator, while its other side presents its plane surface near to and parallel with said smooth flat surface of said first named disk, thus to adapt it to serve as the other electrode of such spark-gap, and separate means for connecting each of said disks with an electric circuit.

2. A structure of the class described, which embodies two electrodes each having a flat surface and each being normally disposed with such flat surface adjacent to the like flat surface of the other, to form a spark-gap therebetween, and means adapted both detachably to support said electrodes in their normal relative positions and to inclose said spark-gap to be air tight, said means comprising an insulator fastened to one of said electrodes by a permanent air-tight joint, and a metal supporting member permanently fastened to said insulator by an air-tight joint, said metal supporting member being detachably fastened directly to the other one of said electrodes to form a metallic air-tight joint therebetween.

In witness whereof, I hereunto subscribe my name this twelfth day of March, A. D., 1915.

FREDERICK G. SIMPSON.

Witnesses:
FRANK WARREN,
O. JOHNSON.